United States Patent
Alqahtani et al.

(10) Patent No.: US 12,247,161 B2
(45) Date of Patent: **\*Mar. 11, 2025**

(54) GEL FORMATION FROM REACTION HEATING

(71) Applicant: Saudi Arabian Oil Company, Dhahran (SA)

(72) Inventors: Hamoud Alqahtani, Dhahran (SA); Zuhair Ali AlYousif, Dhahran (SA); Subhash Chandrabose Ayirala, Dhahran (SA); Muhammad Majid Almajid, Qatif (SA); Ali Abdullah Al-Taq, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,299

(22) Filed: May 1, 2023

(65) Prior Publication Data
US 2024/0368451 A1  Nov. 7, 2024

(51) Int. Cl.
*E21B 36/00* (2006.01)
*C09K 8/512* (2006.01)
*C09K 8/516* (2006.01)
*E21B 33/138* (2006.01)

(52) U.S. Cl.
CPC .............. *C09K 8/516* (2013.01); *C09K 8/512* (2013.01); *E21B 33/138* (2013.01); *E21B 36/008* (2013.01)

(58) Field of Classification Search
None
See application file for complete search history.

(56) References Cited

U.S. PATENT DOCUMENTS

| | | | |
|---|---|---|---|
| 10,030,492 B2 | 7/2018 | Al-Nakhli et al. | |
| 11,787,993 B1* | 10/2023 | Al-Nakhli | E21B 21/003 |
| | | | 166/292 |
| 2014/0318798 A1* | 10/2014 | Mancini | C09K 8/524 |
| | | | 166/335 |

(Continued)

OTHER PUBLICATIONS

Altunina et al., "Thermotropic Gel-Forming and Sol-Forming Systems for Enhanced Oil Recovery and Technologies of Their Joint Application with Thermal Methods for Oil Production," Proceedings of the Scientific-Practical Conference "Research and Development—2016", Dec. 2017, pp. 287-296, 10 pages.

(Continued)

*Primary Examiner* — Andrew Sue-Ako
(74) *Attorney, Agent, or Firm* — Fish & Richardson P.C.

(57) ABSTRACT

A method for sealing a high permeability region in a reservoir is provided. The method includes injecting a gel precursor solution into a high permeability region in a reservoir, injecting a sodium nitrite solution proximate to the high permeability region, and injecting an ammonium chloride solution proximate to the high permeability region. The ammonium chloride solution and the sodium nitrite solution are mixed proximate to the high permeability region. The ammonium chloride solution and the sodium nitrite solution are allowed to react, increasing the temperature of the reservoir proximate to the high permeability region. The gel precursor solution is allowed to react to form a solid gel in the high permeability region.

22 Claims, 6 Drawing Sheets

(56) References Cited

U.S. PATENT DOCUMENTS

| | | | | |
|---|---|---|---|---|
| 2015/0000912 | A1* | 1/2015 | Choudhary | E21B 43/24 166/300 |
| 2016/0265326 | A1* | 9/2016 | Nguyen | E21B 43/267 |
| 2021/0095189 | A1* | 4/2021 | May | C09K 8/516 |
| 2021/0284899 | A1* | 9/2021 | Al-Nakhli | C09K 8/594 |
| 2021/0332285 | A1* | 10/2021 | May | C09K 8/514 |

OTHER PUBLICATIONS

Ding, "An investigation of plugging and increasing oil recovery in sandstone porous media by micrometer-size particle gel," Thesis for the degree of Master of Science in Petroleum Engineering, Missouri University of Science and Technology, Fall 2016, 77 pages.

Lei et al., "New Gel Aggregates for Water Shut-off Treatments," Prepared for the Presentation at the 2010 SPE Improved Oil Recovery Symposium, Apr. 24-28, 2010, 15 pages.

petrowiki.spe.org [online], "Field applications of conformance improvement gel treatments," Available on or before Oct. 19, 2021, via Internet Archive: Wayback Machine URL <http://web.archive.org/web/20211019215955/https://petrowiki.spe.org/Field_applications_of_conformance_improvement_gel_treatments#Water_shutoff_treatments>, retrieved on Mar. 8, 2024, URL <https://petrowiki.spe.org/Field_applications_of_conformance_improvement gel_treatments#Water shutoff treatments>, 7 pages.

Qian et al., "A novel in situ N2 generation system assisted by authigenic acid for formation energy enhancement in an oilfield," RSC Advances, Dec. 2, 2019, 9:39914-39923, 10 pages.

Wang et al., "A Thermal Chemical Reaction System for Natural Gas Hydrates Exploitation," Frontiers in Energy Research, Jan. 12, 2022, 9(804498):1-9, 9 pages.

Wu, "Water Plugging and Acidizing Combination Technology on Fractured Water Breakthrough Oil Well in Low Permeability Reservoirs," Advances in Petroleum Exploration and Development, Mar. 31, 2016, 11(1): 24-29, 6 pages.

You et al., "Enhanced Oil Recovery and Corrosion Inhibition through a Combined Technology of Gel Treatment for Water Shutoff and Corrosion Inhibitor Huff & Puff in Oil Well," Procedia Engineering, 2011, 18:7-12, 6 pages.

* cited by examiner

GEL FORMATION FROM REACTION HEATING

TECHNICAL FIELD

This disclosure relates to methods of heating a solution to form gels.

BACKGROUND

Enhanced oil recovery generally uses the injection of a sweep liquid through an injection well to push oil through a reservoir to a production well. However, flow pathways, such as high permeability regions and fractures, may allow the sweep liquid to bypass the oil and flow directly from the injection well to the production well. Various techniques have been explored to seal the fractures, forcing the liquids to flow through the reservoir rather than the fractures. However, injecting materials that form gels risks damage to the formation by gelling before reaching the fractures. Accordingly, techniques are needed to control the initiation of the gelling reaction.

SUMMARY

An embodiment disclosed herein provides a method for sealing a high permeability region in a reservoir. The method includes injecting a gel precursor solution into a high permeability region in a reservoir, injecting a sodium nitrite solution proximate to the high permeability region, and injecting an ammonium chloride solution proximate to the high permeability region. The ammonium chloride solution and the sodium nitrite solution are mixed proximate to the high permeability region. The ammonium chloride solution and the sodium nitrite solution are allowed to react, increasing the temperature of the reservoir proximate to the high permeability region. The gel precursor solution is allowed to react to form a solid gel in the high permeability region.

DETAILED DESCRIPTION

Embodiments described herein provide a method for sealing fractures and high permeability channels in a reservoir to improve oil production during the injection of sweep liquids, such as water. In the method, a solution of a gel precursor is injected in the area of the fractures in the reservoir. The gel precursor is selected to solidify at an elevated temperature, such as greater than about 70° C., greater than about 80° C., or greater than about 90° C. The heat is generated by the reaction of two salt solutions into the vicinity of the gel precursor. The salt solution include ammonium chloride ($NH_4Cl$) and sodium nitrite ($NaNO_2$), which react upon contact in the presence of a triggering condition, as shown in the following formula:

The reaction is exothermic and irreversible, with a $\Delta H_{Rx}$ of $-79.95$ kcal mol$^{-1}$, and a $K_{eq}$ of 3.9e71 Pa×mole m$^{-3}$ at 25° C.

The triggering condition is a pH of less than about 4 or a temperature of greater than about 60° C. The heat generated will raise the formation temperature causing the gel to solidify and block the high permeability channels or fractures in the reservoir.

Figure 1A:
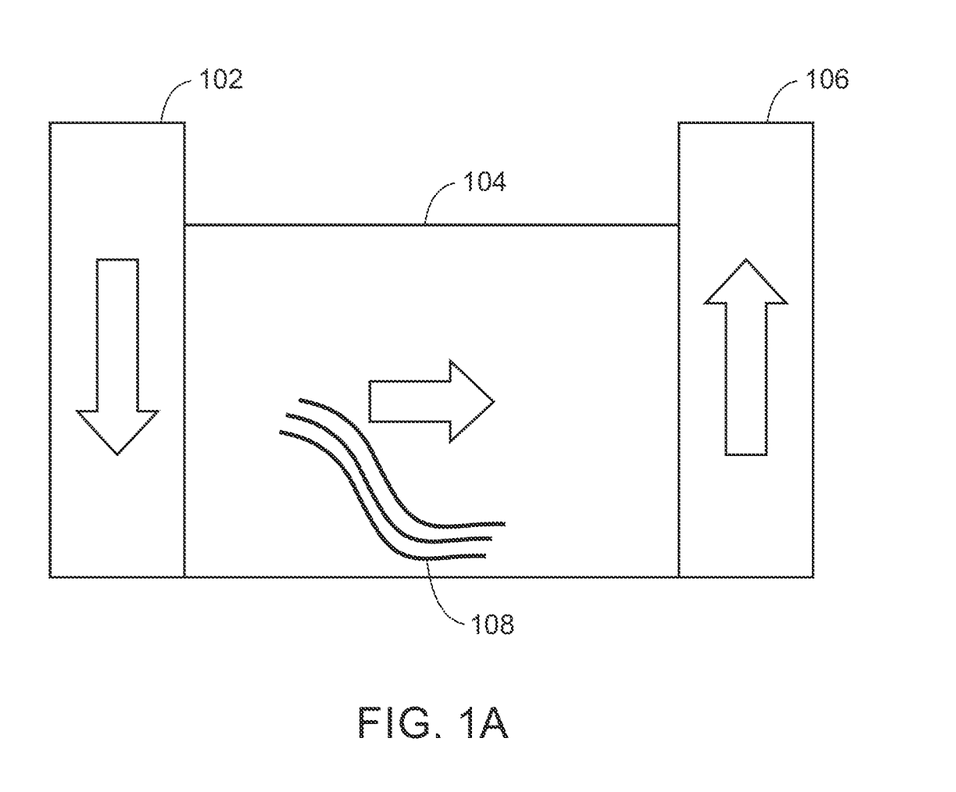
FIG. 1A is a schematic of an initial state before the gel and two salt solutions are injected.

FIG. 1A is a schematic drawing of an initial state before the gel and two salt solutions are injected. As shown in FIG. 1A, enhanced oil recovery (EOR) fluid is injected through an injection well 102 into the reservoir 104. The EOR fluid flows through the reservoir 104 forcing oil towards the production well 106. However, in the reservoir 104, high permeability zone or fractures 108 may allow the EOR fluid to bypass a portion of the reservoir 104, decreasing the efficacy of the injection, and lowering the production of oil from the reservoir 104.

As described herein, this can be mitigated by sealing the fractures, for example, with a gel. Sealing fractures with a gel often requires a high temperature to activate the gelling reactions. However, in lower temperature reservoirs, such as shallower reservoirs, the temperatures may not be sufficient for activation of the gelling reactions. The method disclosed herein provides a source of heat to force the gelling reaction to proceed. The processes involved are summarized in the schematic diagrams shown in FIGS. 1B through 1D.

Figure 1B:
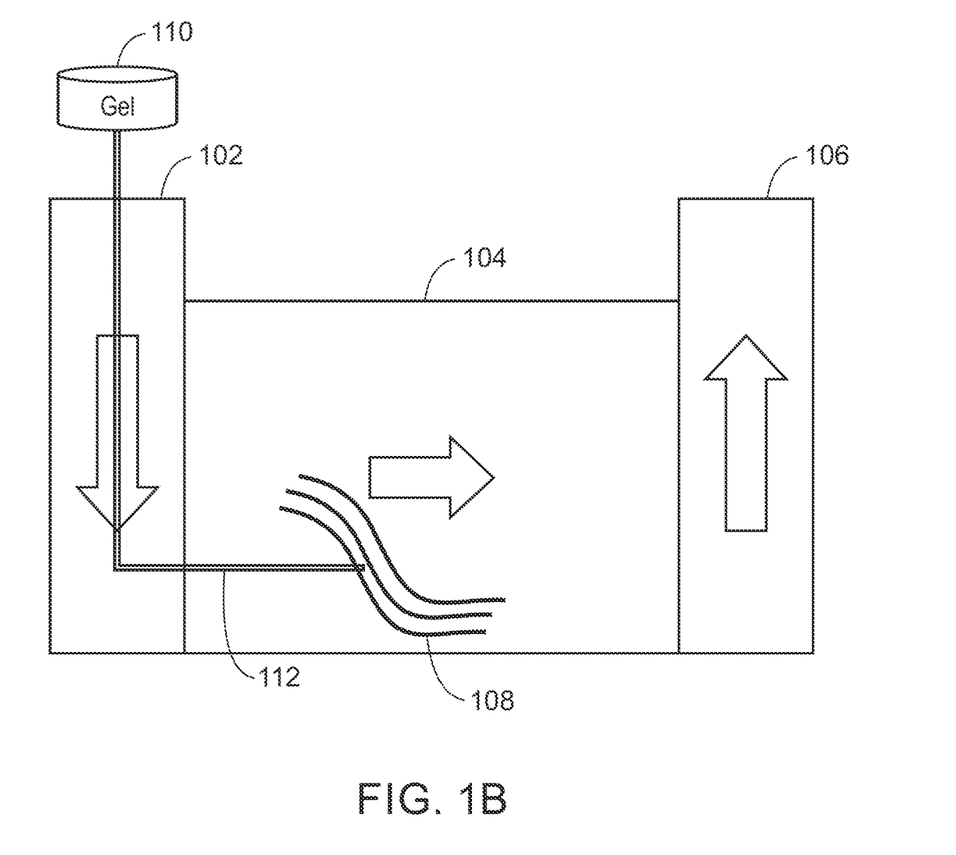
FIG. 1B is a schematic of the gel injection process.

FIG. 1B is a schematic drawing of the gel injection process. A gel precursor solution 110 is injected through coiled tubing 112 placed in the injection well 102 directly to the fractures section of the reservoir. The gel precursor solution will not generally form a gel until heated. Any number of gelling materials that are sensitive to heat for gel formation may be used in the gel precursor solution 110.

In some embodiments, the gel precursor solution 110 includes a water-soluble polymer, such as a biopolymer or a synthetic polymer. In various embodiments, the polymer is a polyacrylamide, an acrylamide copolymer, a polysaccharide, or any combination thereof. The polysaccharide can include guar gum, hydroxypropyl guar gum, or xanthan gum, among others.

The gel precursor solution 110 will also include a cross-linking agent or cross-linker. In some embodiments, the cross-linker is a multivalent cation, such as Cr(III), Al(III), or Ti(III), among others, or any combination thereof. In some embodiments, the cross-linker is an organic chemical, such as hexamethylenetetramine, resorcinol, chromium acetate, chromium malonate, or polyethyleneimine, among others, or any combination thereof.

In various embodiments, the concentration of the polymer in the gel precursor solution is between about 500 ppm and about 50,000 ppm. In some embodiments, the concentration of the polymer in the gel precursor solution is between about 10,000 ppm and about 45,000 ppm, or between about 15,000 ppm and about 30,000 ppm. In some embodiments, the concentration of the polymer in the gel precursor solution is about 40,000 ppm. As the gel is being used for sealing the fractures, and not for viscosity increase in solutions, a higher concentration may be selected. Alternatively, the location of the fractures in the reservoir may be difficult to reach at a high polymer concentration.

In various embodiments, the concentration of the cross-linker is between about 10 ppm and about 10,000 ppm. In some embodiments, the concentration of the cross-linker is between about 50 ppm and about 5000 ppm, or between about 100 ppm and about 2500 ppm or about 200 ppm. The concentration of the cross-linker can be used to control the speed at which the gel forms. Accordingly, a higher concentration may be selected for sealing fractures close to the injection well, while a lower concentration may be selected for sealing fractures farther from the injection well.

Figure 1C:
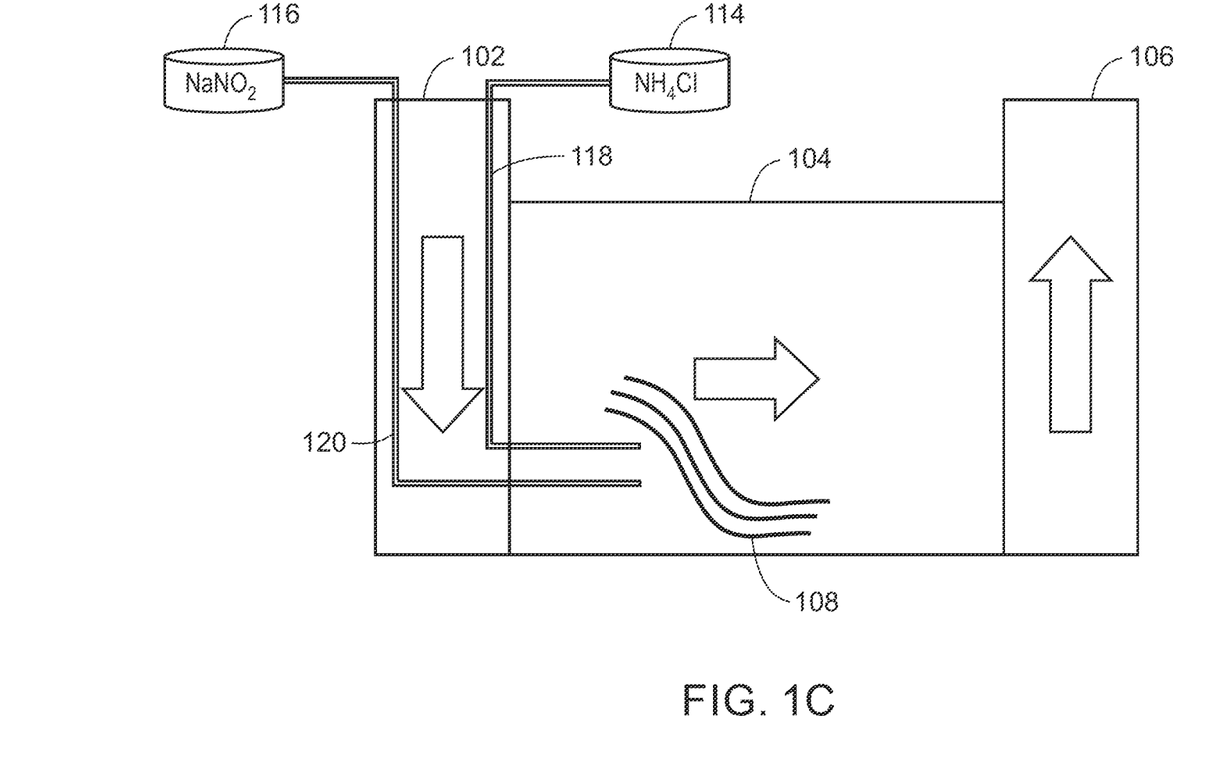
FIG. 1C is a schematic of the injection of the two salt solution.

FIG. 1C is a schematic of the injection of the two salt solutions 114 and 116. Once the gel precursor solution 110 has been injected, heat may be generated in situ by the reaction of the two salts. This may be performed by injecting a solution of $NH_4Cl$(aq.) 114 through a first coiled tubing line 118, and injecting a solution of $NaNO_2$(aq.) 116 through a second coiled tubing line 120, or through the tubing of the injection well 102.

In various embodiments, the solution of $NaNO_2$(aq.) has a concentration of between about 1 molar (M) and about 10 M, or between about 2 M and about 5 M, or between about 3 M and about 4 M. In some embodiments, the concentration of the sodium nitrite solution is about 1 M, 2 M, 3 M, 4 M, or 5 M.

In various embodiments, the solution of $NH_4Cl$(aq.) has a concentration of between about 1 molar (M) and about 7 M, or between about 3 M and about 5 M, or between about 3 M and about 4 M. In some embodiments, the concentration of the ammonium chloride solution is about 1 M, 2 M, 3 M, 4 M, or 5 M.

Upon mixing of the two solutions 114 and 116 downhole at a temperature of 60° C. or more, heat is generated and the temperature of the formation rises. For reservoirs with lower temperatures, the reaction can be triggered by lowering the pH value of the $NH_4Cl$ solution to less than about 4. Lowering the pH can be performed by the addition of either inorganic or organic acids. For example, in some embodiments, HCl is added to the $NH_4Cl$ solution prior to injection. In some embodiments, acetic acid is added to the $NH_4Cl$ solution prior to injection. The concentration of the acid is determined by the pH targeted, for example, less than about 4. A higher concentration of the acid, resulting in a lower pH, can accelerate the reaction increasing the amount of heat generated. In various embodiments, an acid is added to the solution of $NH_4Cl$ (aq.) to lower the pH to below 4, for example, to between about 2.0 and about 4.0, or between about 2.5 and about 3.5, or about 3.5, about 3.0, about 2.5, about 2.0, or lower. In some embodiments, the acid is an organic acid, for example, formic acid, oxalic acid, acetic acid, and the like. In some embodiments, the acid is an inorganic acid, for example, hydrochloric acid, sulfuric acid, and the like.

Figure 1D:
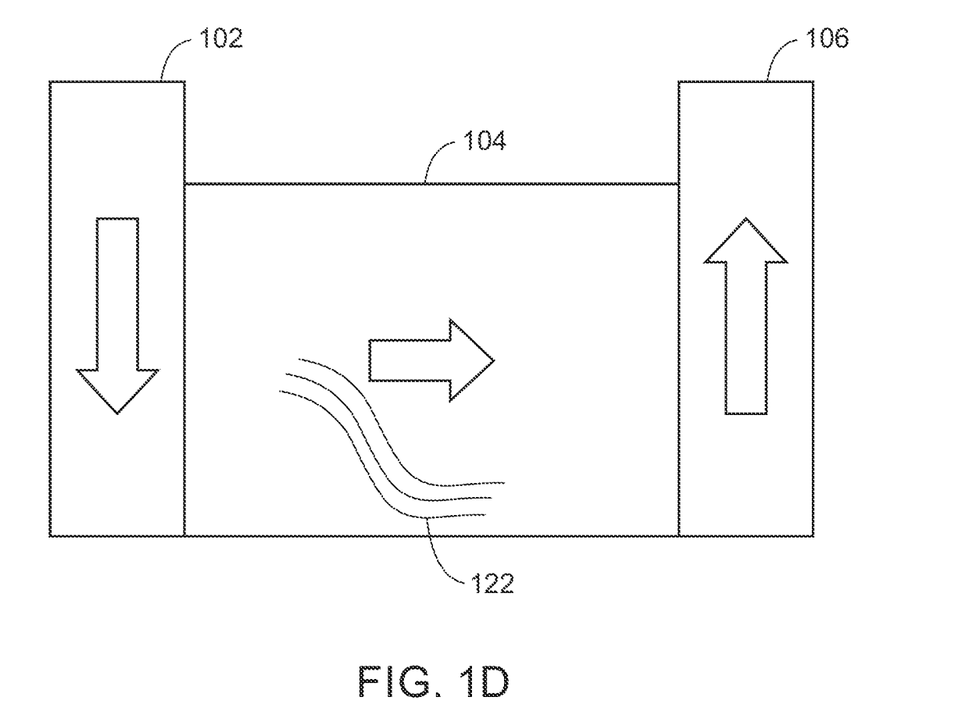
FIG. 1D is a schematic of the reservoir after the fractures are sealed.

FIG. 1D is a schematic of enhanced oil recovery of the reservoir 104 after the fractures 108 are sealed, forming sealed fractures 122. In this schematic, enhanced oil recovery fluids from the injection well 102 will pass through areas of the reservoir 104 that were previously bypassed, forcing oil to the production well 106. This will increase the amount of oil that can be produced from the reservoir 104.

Figure 2:
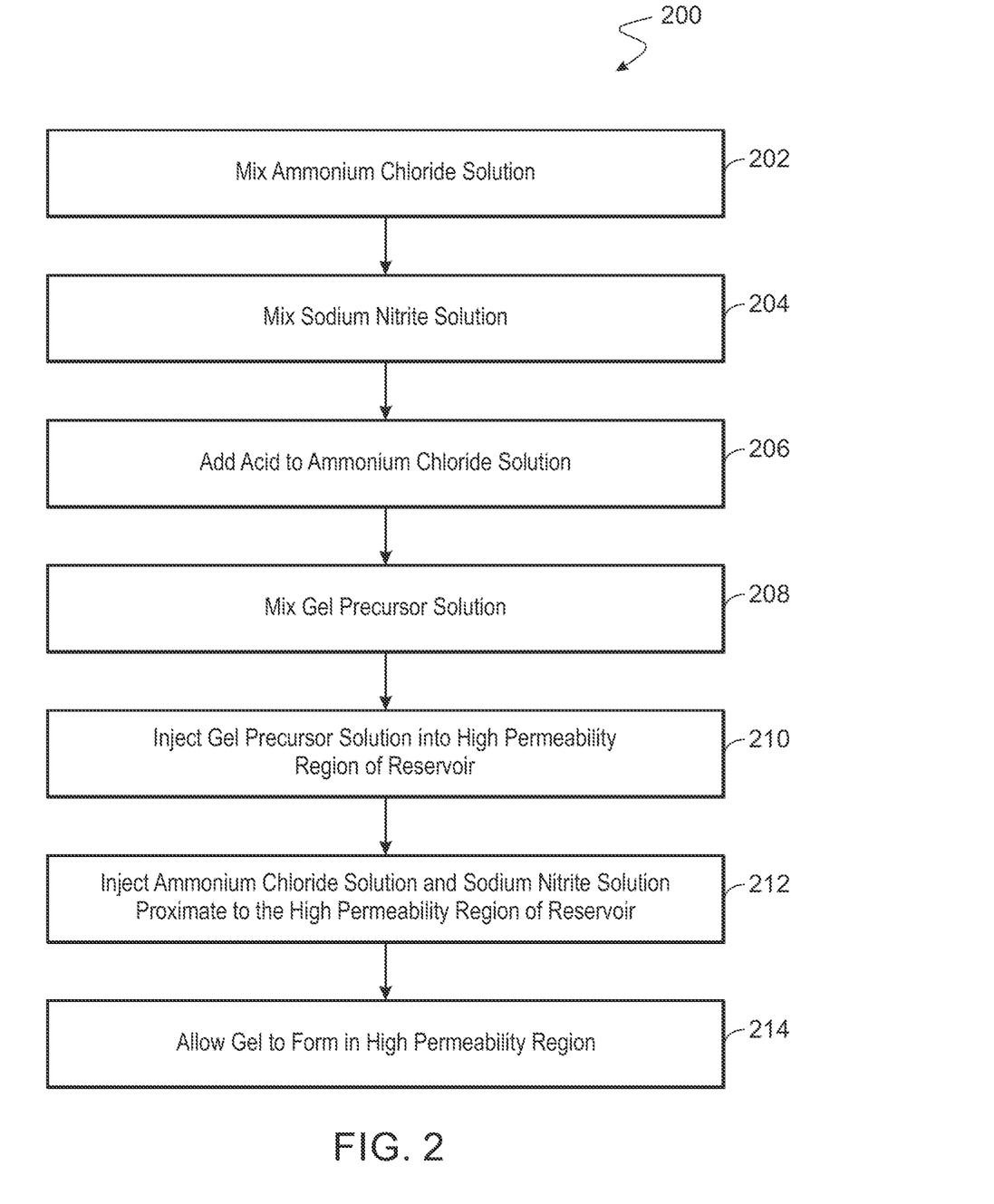
FIG. 2 is a process flow diagram of a method for sealing fractures in a formation using two salt solution to generate heat, triggering gelling of a gel precursor solution.

FIG. 2 is a process flow diagram of a method 200 for sealing fractures in a formation using two salt solution to generate heat to activate the gelling of a gel precursor solutions. The method 200 begins at block 202 with the mixing of an ammonium chloride solution. At block 204, a sodium nitrite solution is mixed.

At block 206, an acid is added to the ammonium chloride solution. If the reservoir is at a sufficiently high temperature, for example, above 60° C. At block 208, the precursor gel solution is mixed. As described herein, the concentration of the components may be adjusted to control the gelation time.

At block 210, the gel precursor solution is injected into a high permeability region of the reservoir. This may be performed using a coiled tubing line to the high permeability region. The high permeability region may include fractures, sand beds, or other high permeability materials.

At block 212, the ammonium chloride solution and sodium nitrite solution proximate to the high permeability region of the reservoir. For example, the solutions may be injected above or below the portion of the high permeability region of the reservoir that holds the gel precursor solution. In some embodiments, the solutions are injected into the well bore next to the high permeability region of the reservoir to start the gelation reaction, which may then continue deeper into the high permeability region of the reservoir.

At block 214, the gel is allowed to form in the high permeability region of the reservoir. This may take about 10 min., about 30 min., about 1 hour, about 5 hours, about 24 hours, or about 48 hours, or longer, depending on the size of the high permeability region of the reservoir.

Example

Figure 3:
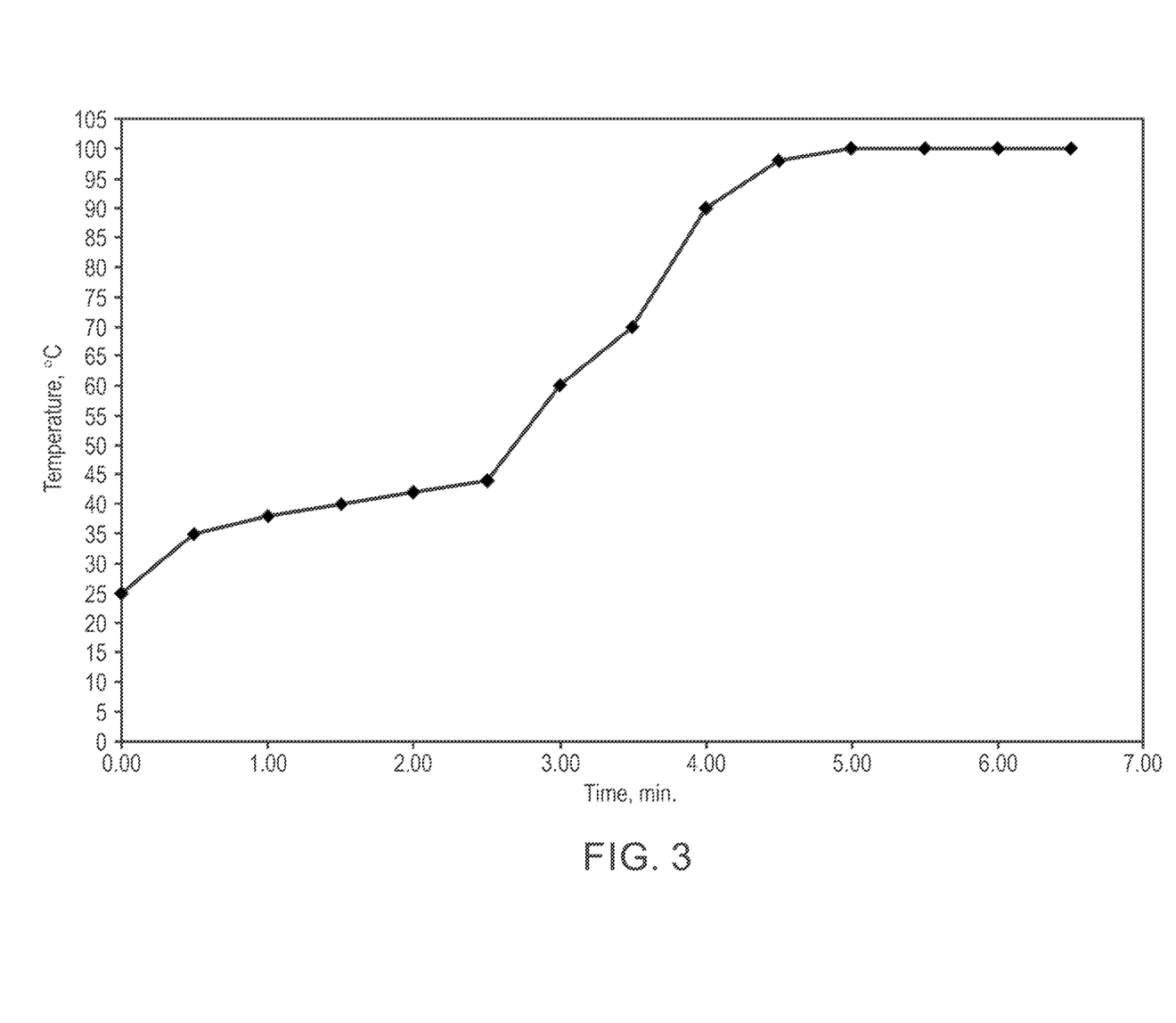
FIG. 3 is a drawing of an increase in temperature as the two salt solutions react.

As noted herein, the reaction is exothermic. The amount of generated heat is function of the media temperature and acidity as well as the concentration of the salt solutions. The heat that can be generated by the reaction of the two salts was tested in a high temperature/high pressure reactor by reacting 64 mL of a 3M solution of $NaNO_2$ with 36 mL of a 3M solution of $NH_4Cl$. The reaction was catalyzed by the addition of 0.5 mL of acetic acid to the $NH_4Cl$ solution. FIG. 3 is a plot of an increase in temperature as the two salt solutions react. Higher temperatures can be achieved using higher concentrations of the salts.

Embodiments

An embodiment disclosed herein provides a method for sealing a high permeability region in a reservoir. The method includes injecting a gel precursor solution into a high permeability region in a reservoir, injecting a sodium nitrite solution proximate to the high permeability region, and injecting an ammonium chloride solution proximate to the high permeability region. The ammonium chloride solution and the sodium nitrite solution are mixed proximate to the high permeability region. The ammonium chloride solution and the sodium nitrite solution are allowed to react, increasing the temperature of the reservoir proximate to the high permeability region. The gel precursor solution is allowed to react to form a solid gel in the high permeability region.

In an aspect, the method includes injecting the ammonium chloride solution through a first coiled tubing line placed proximate to the high permeability region.

In an aspect, the method includes injecting the sodium nitrite solution through a second coiled tubing line placed proximate to the high permeability region.

In an aspect, the method includes injecting the sodium nitrite solution through an injection line, outside of a coiled tubing line holding the ammonium chloride solution.

In an aspect, the method includes mixing a gel precursor solution, wherein the gel precursor solution includes a water-soluble polymer and a cross-linker. In an aspect, the water-soluble polymer includes a biopolymer or a synthetic polymer. In an aspect, the water-soluble polymer includes a polyacrylamide, an acrylamide copolymer, a polysaccharide, or any combination thereof.

In an aspect, the concentration of the water-soluble polymer in the gel precursor solution is between about 500 ppm and about 50,000 ppm. In an aspect, the concentration of the water-soluble polymer in the gel precursor solution is about 40,000 ppm.

In an aspect, the cross-linker includes a multivalent cation. In an aspect, the cross-linker includes Cr(III), Al(III), or Ti(III), or any combination thereof.

In an aspect, the cross-linker includes an organic compound. In an aspect, the cross-linker includes hexamethylenetetramine, resorcinol, chromium acetate, chromium malonate, or polyethyleneimine, or any combination thereof.

In an aspect, the concentration of the cross-linker in the gel precursor solution is between about 10 ppm and about 10,000 ppm. In an aspect, the concentration of the cross-linker in the gel precursor solution is about 200 ppm.

In an aspect, the sodium nitrite solution is about 1 molar (M) in concentration, about 2 M in concentration, about 3 M in concentration, about 4 M in concentration, or about 5 M in concentration.

In an aspect, the ammonium chloride solution is about 1 molar (M) in concentration, about 2 M in concentration, about 3 M in concentration, about 4 M in concentration, or about 5 M in concentration.

In an aspect, the method includes adjusting a concentration of the sodium nitrite solution and a concentration of the ammonium chloride solution to control the temperature generated by the reaction.

In an aspect, the method includes mixing an acid with the ammonium chloride solution to adjust the pH to about 1, about 2, about 3, or about 4. In an aspect, the method includes adjusting the pH to control a reaction time of the sodium nitrite with the ammonium chloride.

In an aspect, the method includes allowing the ammonium chloride solution and the sodium nitrite solution to react for about 5 minutes, about 10 minutes, or about 20 minutes.

In an aspect, the method includes allowing the gel precursor solution to react to form a solid gel for about 10 min., about 30 min., about 1 hour, about 5 hours, about 24 hours, or about 48 hours.

Other implementations are also within the scope of the following claims.

What is claimed is:

1. A method for sealing a flow pathway in a reservoir, comprising:
    injecting a gel precursor solution directly into the flow pathway in a reservoir;
    injecting a sodium nitrite solution proximate to and not directly into the flow pathway;
    injecting an ammonium chloride solution proximate to and not directly into the flow pathway;
    mixing the ammonium chloride solution and the sodium nitrite solution;
    allowing the ammonium chloride solution and the sodium nitrite solution to react with each other to generate heat, thereby increasing the temperature of the reservoir proximate to the flow pathway; and
    allowing the gel precursor solution to form a solid gel in the flow pathway.

2. The method of claim 1, comprising injecting the ammonium chloride solution through a first coiled tubing line placed proximate to and not directly in the flow pathway.

3. The method of claim 1, comprising injecting the sodium nitrite solution through a second coiled tubing line placed proximate to and not directly in the flow pathway.

4. The method of claim 1, comprising injecting the sodium nitrite solution through an injection line, outside of a coiled tubing line holding the ammonium chloride solution.

5. The method of claim 1, comprising mixing the gel precursor solution, wherein the gel precursor solution comprises a water-soluble polymer and a cross-linker.

6. The method of claim 5, wherein the water-soluble polymer comprises a biopolymer or a synthetic polymer.

7. The method of claim 5, wherein the water-soluble polymer comprises a polyacrylamide, an acrylamide copolymer, a polysaccharide, or any combination thereof.

8. The method of claim 5, wherein the concentration of the water-soluble polymer in the gel precursor solution is between about 500 ppm and about 50,000 ppm.

9. The method of claim 5, wherein the concentration of the water-soluble polymer in the gel precursor solution is about 40,000 ppm.

10. The method of claim 5, wherein the cross-linker comprises a multivalent cation.

11. The method of claim 10, wherein the cross-linker comprises Cr(III), Al(III), or Ti(III), or any combination thereof.

12. The method of claim 5, wherein the cross-linker comprises an organic compound.

13. The method of claim 12, wherein the cross-linker comprises hexamethylenetetramine, resorcinol, chromium acetate, chromium malonate, or polyethyleneimine, or any combination thereof.

14. The method of claim 5, wherein the concentration of the cross-linker in the gel precursor solution is between about 10 ppm and about 10,000 ppm.

15. The method of claim 5, wherein the concentration of the cross-linker in the gel precursor solution is about 200 ppm.

16. The method of claim 1, wherein the sodium nitrite solution is about 1 molar (M) in concentration, about 2 M in concentration, about 3 M in concentration, about 4 M in concentration, or about 5 M in concentration.

17. The method of claim 1, wherein the ammonium chloride solution is about 1 molar (M) in concentration, about 2 M in concentration, about 3 M in concentration, about 4 M in concentration, or about 5 M in concentration.

18. The method of claim 1, comprising adjusting a concentration of the sodium nitrite solution and a concentration of the ammonium chloride solution to control the temperature generated by the reaction.

19. The method of claim 1, comprising mixing an acid with the ammonium chloride solution to adjust the pH to about 1, about 2, about 3, or about 4.

20. The method of claim 19, comprising adjusting the pH to control a reaction time of the sodium nitrite with the ammonium chloride.

21. The method of claim 1, comprising allowing the ammonium chloride solution and the sodium nitrite solution to react with each other for about 5 minutes, about 10 minutes, or about 20 minutes.

22. The method of claim 1, comprising allowing the gel precursor solution to form a solid gel for about 10 min., about 30 min., about 1 hour, about 5 hours, about 24 hours, or about 48 hours.

* * * * *